United States Patent [19]
Moore

[11] Patent Number: 5,151,013
[45] Date of Patent: Sep. 29, 1992

[54] BLADE LOCK FOR A ROTOR DISK AND ROTOR BLADE ASSEMBLY

[75] Inventor: Jerry H. Moore, Palm Beach Gardens, Fla.

[73] Assignee: United Technologies Corporation, Hartford, Conn.

[21] Appl. No.: 634,906

[22] Filed: Dec. 27, 1990

[51] Int. Cl.⁵ .............................................. B63H 1/20
[52] U.S. Cl. .................................. 416/221; 416/220 R; 416/95
[58] Field of Search ............... 416/219 R, 220 R, 215, 416/218, 95, 96 R, 97 R, 198 R, 198 A, 221

[56] References Cited

U.S. PATENT DOCUMENTS

| | | | |
|---|---|---|---|
| 3,759,633 | 9/1973 | Tournere | 416/220 R |
| 3,888,601 | 6/1975 | Glassburn | 416/220 R |
| 4,016,636 | 4/1977 | Schneider et al. | 416/198 A X |
| 4,021,138 | 5/1977 | Scalzo et al. | 416/220 R X |
| 4,304,523 | 12/1981 | Corsmeier et al. | 416/220 R X |
| 4,444,544 | 4/1984 | Rowley | 416/218 X |
| 4,470,756 | 9/1984 | Rigo et al. | 416/220 R |
| 4,480,957 | 11/1984 | Patel et al. | 416/219 R X |
| 4,566,857 | 1/1986 | Brumen | 416/220 R |
| 4,767,276 | 8/1988 | Barnes et al. | 416/221 |
| 5,049,035 | 9/1991 | Marlin | 416/220 R X |

FOREIGN PATENT DOCUMENTS

| | | | |
|---|---|---|---|
| 1037572 | 9/1953 | France | |
| 0186004 | 11/1982 | Japan | 416/219 R |

Primary Examiner—Edward K. Look
Assistant Examiner—Todd Mattingly
Attorney, Agent, or Firm—Gene D. Fleischhauer

[57] ABSTRACT

A rotor disk 18 and rotor blade 26 assembly is disclosed having a blade lock 66 which retains the rotor blade against axial movement in an axially extending blade retention slot 58. Various construction details are developed which shield the dead rim region $D_d$ and shift at least a portion of the loads associated with the locking device from the dead rim. In one detailed embodiment, a projection 68 from the live rim $D_1$ of the disk 18 is adapted by slots 86 to receive blade locks 66.

10 Claims, 5 Drawing Sheets

BLADE LOCK FOR A ROTOR DISK AND ROTOR BLADE ASSEMBLY

The invention described herein was made in the performance of work under NASA contract and is subject to the provisions of Section 305 of the National Aeronautics and Space Act of 1958 (72 Stat. 435; 42 U.S.C. 2457).

TECHNICAL FIELD

This invention relates to a rotary machine having a turbine for driving another rotating portion of the rotary machine. More particularly, this invention relates to a rotor disk and rotor blade assembly and a device for retaining the blades against axial movement. It has particular application to rocket engines for pumping cryogenic fuel and oxygen to the combustion chamber of the rocket engine, but has application to other fields employing rotary machines.

BACKGROUND OF INVENTION

A rocket engine is typically provided with a reservoir of cryogenic fuel and a reservoir of cryogenic oxidizer for the fuel. The cryogenic fuel and the cryogenic oxygen are pumped in liquid form to the rocket chamber where the fuel and oxidizer are burned to produce thrust for the rocket.

Turboprops are used to pump these fuels. Each turbopump has a turbine and a pump. The turbine has a rotor assembly which is connected to the pump. A flowpath for hot, pressurized working medium gases extends axially through the rotor assembly. The rotor assembly is driven by these gases about its axis of rotation.

Typically, the rotor assembly has a rotor disk and one or more arrays of rotor blades. The rotor blades extend outwardly into the working medium flowpath. The rotor blades engage the outer periphery or rim region of the rotor disk. The rim region of the rotor disk is adapted by axially oriented slots to receive the rotor blades.

The working medium gases exert a tangential force and an axial force on the blades as the gases are flowed through the rotor assembly. The axial force on the rotor blades urges the rotor blades axially rearwardly and out of the blade retention slots. Lock means are provided to lock the blades against axial movement. These locks add to the rotational mass of the rotor assembly and must be carried by the rotor disk.

The tangential force exerted by the working medium gases drives the rotor assembly about its axis of rotation. As the rotor assembly rotates, the rim region of the disk between the slots can only exert a radial force on the blades to retain the blades against outward movement. Because the blade attachment slots interrupt the circumferential continuity of this portion of the rim region, this part of the rim region is unable to generate circumferential ("hoop") stresses to resist outward movement of the blades. This circumferentially discontinuous region is referred to as the "dead rim" of the disk. The circumferentially continuous part of the rim region inwardly of the dead rim region resists the radial rotational loads exerted by the dead rim with hoop stresses. This part of the rim region is referred to as the live rim region of the disk because of its ability to sustain hoop stresses.

The radial forces or rotational loads in the dead rim are aggravated by stress concentrations associated with the fillets used to form the blade retention slot or fillets in other parts of the disk.

Additional stresses in the dead rim resulting from axial temperature gradients (thermal stresses) may cause, in combination with the rotational stresses, unacceptably high stresses in the dead rim.

An example of a construction used to retain rotor blades in gas turbine engines is shown in U.S. Pat. No. 4,444,544 issued to Rowley entitled "Locking Of Rotor Blades On A Rotor Disk". In this construction, the rotor blade has a half-groove formed by an extension from the rotor blade facing a corresponding half-groove in the rotor disk. A lock pin is inserted in the cooperating grooves to lock the rotor blade against axial movement. The radial load exerted by the rotor blade on the rotor disk is increased by the mass of the groove on the rotor blade and the mass of the blade lock. In high speed rotation, these masses may cause additional stresses which may in some constructions be unacceptable. No effort is made to shield the dead rim region of the disk.

Another example of a construction providing axial retention is shown in French Patent 1,037,572 issued to Haworth and Petrie. A projection from the rotor blade has a groove. A cooperating groove is formed in an extension from the live rim region of the rotor disk. A lock pin is inserted in these grooves to restrain the blade against axial movement. No shielding is provided to the dead rim.

An example of a construction for axially retaining the rotor blades and shielding the region of the rotor blades is shown in U.S. Pat. No. 3,137,478 entitled "Cover Plate Assembly For Sealing Spaces Between Turbine Buckets" issued to Farrell. The cover plate assembly engages the blade retention slot and shields the side of the turbine blades and the dead rim from hot working medium gases. The rotational loads of the cover plate are transmitted to the disk through the dead rim region of the disk which increases stresses in the dead rim.

In the Rowley, Haworth and Farrell constructions, the mass of the extension on the rotor blade and the mass of the locking device are radial loads which are transmitted to the live rim of the rotor disk through the dead rim region of the rotor disk. These radial loads at the side of the disk combined with the radial loads of the rotor blade and thermal stresses resulting from contact with the hot working medium gases or with cooling gases adjacent the rotor disk may cause significant stresses in the dead rim region of the disk or at other locations in the rim region. The problem is complicated by the stress concentrations which result from fillets of the blade retention slot.

U.S. Pat. No. 4,021,138 issued to Scalzo et al, entitled "Rotor Disk, Blade And Seal Blade Assembly For Cooled Turbine Rotor Blades" forms an enclosed cooling chamber on a rotor disk. The seal plate which forms one side of the chamber is trapped radially against an inwardly facing local cam surface which is a circumferentially interrupted projection from the disk.

The above notwithstanding, scientists and engineers working under the direction of Applicant's Assignee have sought to decrease thermal stresses and rotational stresses that occur in the dead rim region of the rotor disk with a rotor blade lock having few parts and low radial profile to minimize the mass of the lock.

DISCLOSURE OF THE INVENTION

This invention is in part predicated on the recognition that axial temperature gradients may be increased in critical locations of a rotor disk by cooling gases flowing past the inner portion of the dead rim and the outer portion of the live rim to cool the rotor disk or the rotor blades. These gases may leak past the side of the disk into the working medium flowpath at a location which is adjacent to a part of the dead rim heated in the radial direction by the hot working medium gases and may cause a severe axial gradient at the side of the disk with large thermal stresses.

According to the present invention, a rotor disk and rotor blade assembly has a projection extending from the live rim of the disk and a blade lock which shields the dead rim leaving an insulating gap therebetween to reduce thermal gradients in the blade retention side of the dead rim, the blade lock being attached to an outer part of the projection to minimize the height of the blade lock and to support at least part of the blade lock from the live rim of the disk.

In accordance with one embodiment of the present invention, the blade lock has a base section which engages a slot in the projection and which is spaced axially from the dead rim region of the disk to leave the insulating gap therebetween and, has a thermal shield which extends from the base section to the dead rim region of the disk over the insulating gap to block heat transfer to cooling fluid in the insulating gap and adjacent cavities from part of the dead rim region of the disk.

According to one detailed embodiment of the present invention, a lock ring is disposed in the insulating gap to block movement of the blade lock; and the projection has a circumferentially extending groove inwardly of the insulating gap which extends laterally to permit movement of the lock ring to a second position (in the groove) out of engagement with the blade lock.

A primary feature of the present invention is a rotor disk having a projection extending from the live rim of the disk. Another feature is a blade lock which engages the projection. The blade lock is spaced axially from the rotor disk and radially from the projection leaving an insulating gap I therebetween. In one embodiment, a feature is a plurality of axially oriented slots in the projection. The blade lock has a base which engages the projection to form a wall bounding the gap. The blade lock has a thermal shield which extends axially into proximity with the dead rim region of the rotor disk. In one embodiment, a feature is a laterally extending groove in the projection at a location inwardly of the interface between the live rim and the dead rim regions of the disk. Lock means, such as a split lock ring which extends circumferentially in the insulating gap under operative conditions, is deflectable into the groove to permit disassembly of the blade lock.

A primary advantage of the present invention is the fatigue life of a rotor disk which results from reducing thermal stresses with a thermal shield in the dead rim of the disk. Another advantage of the present invention is the disk fatigue life which results from transferring at least a portion of the rotational loads of a blade lock and its locking device through a projection directly to the live rim of the disk. Still another advantage is the disk fatigue life which results from the reduced mass of the blade lock in comparison to other blade locks which also provide thermal shielding to the disk rim but require more parts, or have a greater radial profile. Another advantage is the ease of assembly and disassembly which is promoted by disposing a lock ring movable from the installed position to a position which permits disassembly of the blade lock.

The foregoing features and advantages of the present invention will become more apparent in light of the following detailed description of the best mode of carrying out the invention and the accompanying drawings.

BEST MODE FOR CARRYING OUT THE INVENTION

Figure 1:
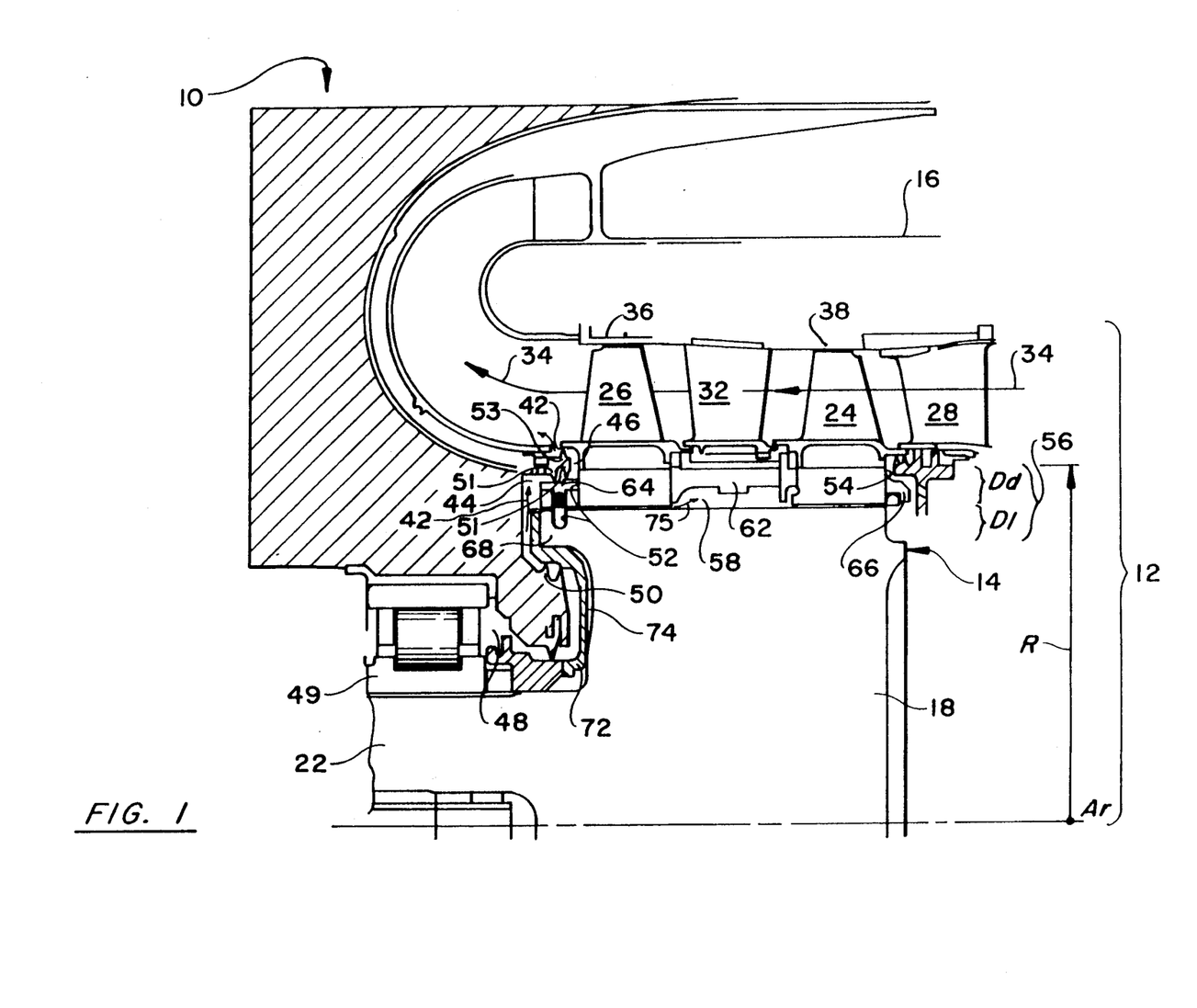
FIG. 1 is a side elevation view partly in section and partly broken away to show a rotary machine having a rotor assembly and a stator assembly.

FIG. 1 is a side elevation view of one embodiment of a rotary machine, showing part of a turbopump 10 for a rocket engine which is used in the engine to pump fuel. The turbopump has a turbine 12. The turbine has a rotor assembly 14 and a stator assembly 16. The rotor assembly has an axis of rotation $A_r$. A rotor disk 18 having a radius R extends circumferentially about the axis H of rotation $A_r$. A shaft 22 connects the turbine to a centrifugal pump (not shown) for the fuel. Arrays of rotor blades as represented by the rotor blade 24 and the rotor blade 26 extend radially outwardly into proximity with the stator assembly.

The stator assembly 16 includes arrays of stator vanes as represented by the stator vane 28 and the stator vane 32. The arrays of stator vanes are disposed in alternating fashion between the arrays of rotor blades. The stator vanes extend radially inward into proximity with the rotor assembly 14.

A flowpath 34 for hot working medium gases extends axially through the turbine, passing in succession between the arrays of stator vanes 28, 32 and the arrays of rotor blades 24, 26. Under operative conditions, the working medium gases can approach temperatures of seventeen hundred degrees (1700°) Fahrenheit. Seal assemblies, as represented by the stator seal assembly 36 and stator seal assembly 38, extend along the stator assembly outwardly of the rotor assembly to confine the hot working medium gases to the flowpath. A cooling fluid flowpath 42 passes through cooling fluid cavities, as represented by the cavity 44 and the cavity 46. The cavities are disposed adjacent the rotor assembly 14 and the stator assembly 16. These cooling fluid cavities provide buffer regions which block the entry of hot, working medium gases into pre-selected regions of the engine, such as the bearing compartment 48 of the engine.

The stator assembly 16 has bearings disposed in the bearing compartment, as represented by the bearing 49, which rotatably engage the shaft 22 of the rotor assembly. The stator assembly includes knife-edge seals, as represented by the seals 50, the seals 51 and the seals 52, which extend into proximity with mating structure on the rotor assembly 14 to seal the cooling fluid cavities. A source of pressurized cooling gas (not shown), such as hydrogen at minus three hundred degrees (−300°) Fahrenheit is in flow communication with a cooling fluid flowpath 42. The cooling fluid flowpath passes through the cavities and thence to the rotor assembly to supply cooling gases to the rotor assembly.

The rotor disk 18 has a first side 53 facing in the downstream axial direction and a second side 54 facing in the upstream axial direction. A portion of the first side is adjacent to the cooling fluid cavity 44. The rotor assembly has a rim region 56 which in a typical construction comprises the outermost quarter (0.25 R) of the radius R of the rotor disk. A plurality of blade attachment slots, as represented by the slot 58, extend from the first side of the disk. In the embodiment shown, the slots extend to the second side of the disk. The blade attachment slots adapt the disk to receive the arrays of rotor blades 24, 26, with one rotor blade from each array at each slot. As mentioned above, the blade attachment slots interrupt the circumferential continuity of this portion of the rim region. Because of the discontinuous nature of this part of the rim region in the circumferential direction, this part of the rim region is unable to sustain hoop stresses (circumferential stresses). This circumferentially discontinuous region $D_d$ is referred to as the "dead rim" region of the disk. The circumferentially continuous part of the rim region inwardly of the dead rim region is referred to as the live rim region $D_l$ of the disk because of its ability to resist hoop stresses resulting from rotational loads pulling outwardly.

The rotor assembly also includes spacers, as represented by the spacer 62, disposed in the attachment slot between the adjacent arrays of rotor blades. A blade lock, as represented by the blade lock 64, engages the rotor disk 18 at the first side 52 to restrain the rotor blades against movement in the aft direction. A blade lock 66 on the second side of the rotor disk blocks the blades against movement in the fore direction.

The rotor disk 18 has an axial projection 68 which extends circumferentially about the rim region 56 of the disk. The axial projection adapts the rotor disk to receive the blade lock 64. A side plate 72 is disposed inwardly of the radial projection and is trapped radially by the projection.

The side plate 72 is adjacent to the first side 52 of the rotor disk and is spaced by a slight axial distance from the rotor disk 18. A dead space for cooling fluid, such as hydrogen from a source of hydrogen (not shown) at minus three hundred degrees (300°) Fahrenheit is first which is heated to raise its temperature. A second flowpath 75 extends up the second side of the disk 18 to the rim region 56 of the disk. The flowpath extends under the rotor blades and rearwardly from the cooling cavity 44 and thence to the working medium flowpath.

Figure 2:
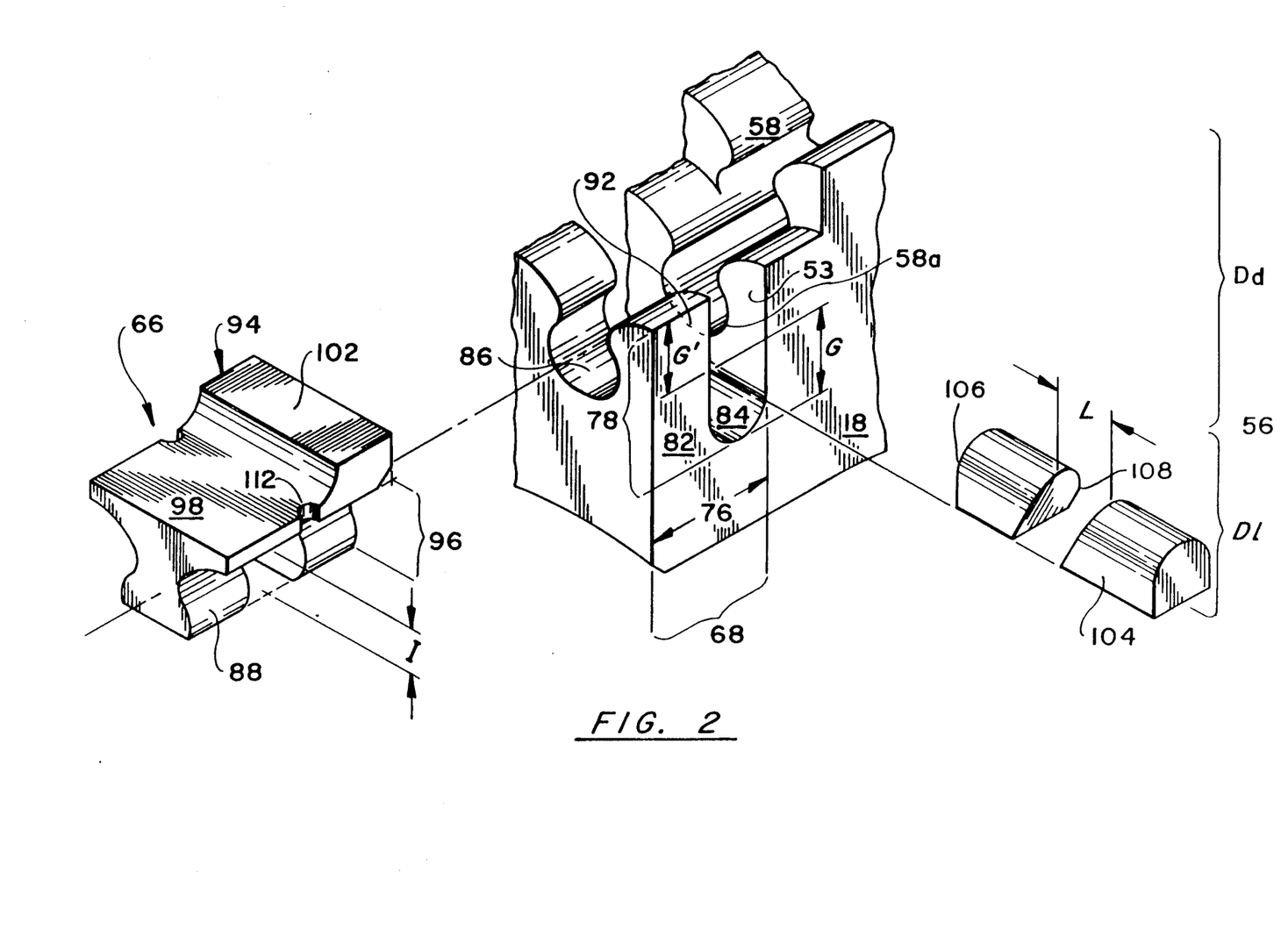
FIG. 2 is a partial perspective view of the rotor disk and blade lock taken along a radial section plane and broken away for clarity.

FIG. 2 is a partial perspective view of the rotor disk and blade lock shown in FIG. 2 taken along a section plane which passes through the axis of rotation $A_r$. The view is broken away for clarity. The axial projection 68 on the first side 52 of the rotor disk 18 extends circumferentially about the disk. The projection extends axially from the live rim region $D_l$ of the rotor disk. The region of the rim from which the projection extends is at a location which is spaced radially inwardly from the dead rim region $D_d$ of the rotor disk.

The axial projection 68 has an inner part, such as a first section 76 which extends axially from the first side of the rotor disk. The projection has an outer part, such as a second section 78 which extends radially outward from the first section. The second section has a circumferentially continuous wall 82 which is spaced axially from the rim region 56 of the rotor disk leaving a groove 84 therebetween which extends laterally with respect to the blade attachment slot 58. The groove has a depth G. A plurality of slots 86, one at each rotor blade 26, are radially outward of the groove and extend axially through the second section of the projection. Each slot has a depth G' which interrupts the circumferential continuity of the projection and adapts the projection to receive a blade lock 66.

As noted, the rotor disk and rotor blade assembly 18, 24 have a blade lock at each slot in the projection 68. In alternate constructions, a single blade lock might engage two slots but this would require smaller tolerances with increased difficulty in fabrication.

The blade lock 66 has a base section 88 which engages the slot 86 in the projection to restrain the blade lock laterally in either direction and radially in either direction. The base section 88 of the blade lock and the second section 78 of the projection form a second wall 92 extending from the first wall. The second wall is spaced axially from the dead rim region $D_d$ of the disk leaving an insulating gap I therebetween. The insulating gap has a depth that is equal to or less than the depth G' of the slot.

Figure 3:
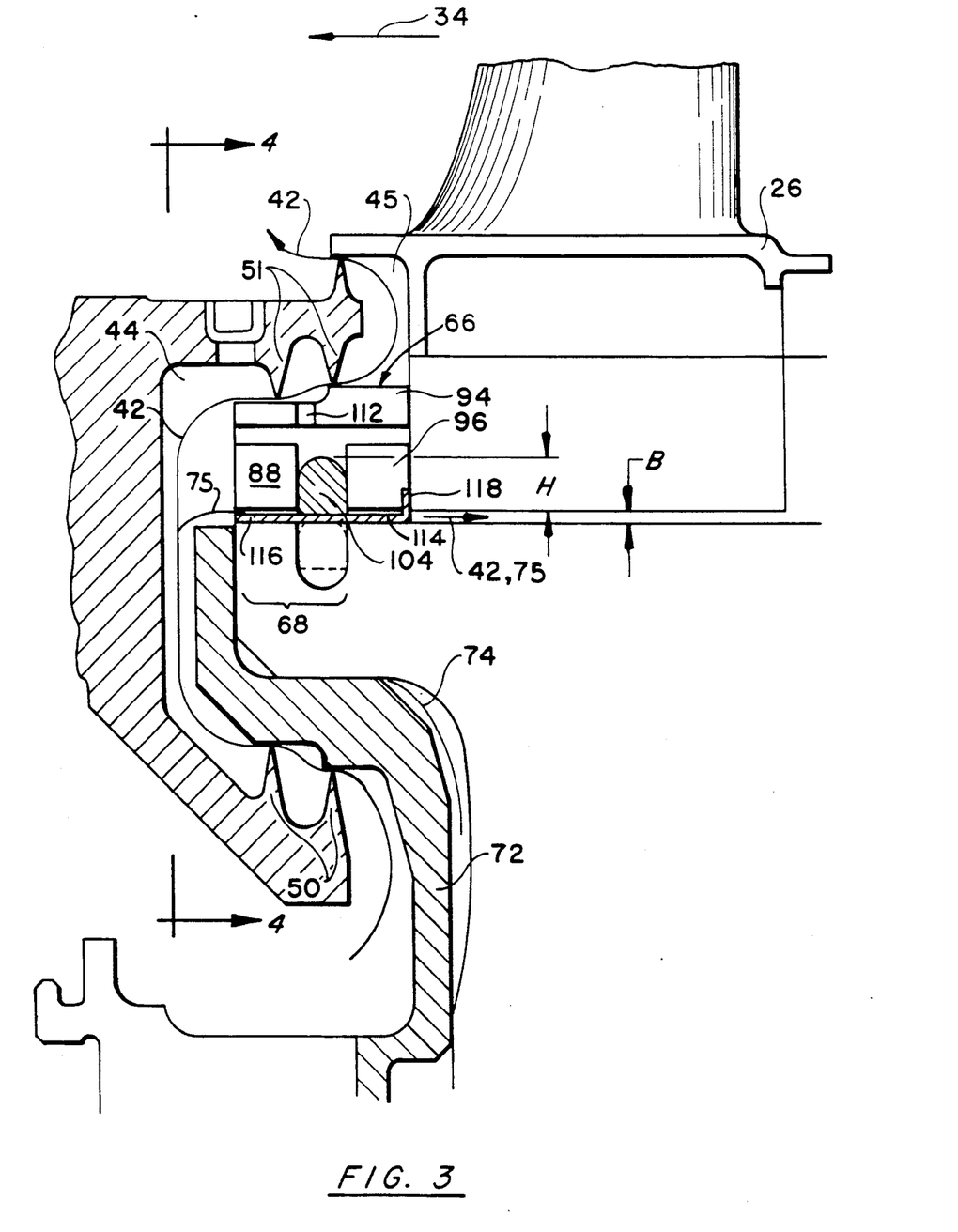
FIG. 3 is an enlarged view of a portion of the rotor assembly shown in FIG. 1 and a portion of the adjacent stator assembly.

As shown in FIG. 2 and FIG. 3, the blade lock 66 has a thermal shield section 94. The thermal shield section extends axially from the base section into close proximity with the side of the disk 52. The thermal shield section radially bounds the insulating gap I in a radially outward direction.

The blade lock 66 has a radial extension 96 which extends radially inward from the thermal shield section. The radial extension adapts the thermal shield section to engage a slot in the rotor disk, such as the slot 58a shown which is a continuation of the blade attachment slot 58. The disk about the slot restrains the thermal shield section laterally in both directions and radially in both directions. The radial extension and the portion of the disk bounding the blade attachment slot form another wall spaced from the wall which bounds axially the insulating gap I.

The thermal shield section 94 has a first seal land 98 on the base section which faces radially outward and receives direct radial support in both directions from the projection (that is, the projection is directly beneath the seal land). The thermal shield section has a second seal land 102 which faces radially outward and receives direct radial support in both directions from the first side 52 of the disk 18 which is directly beneath the seal land. These seal lands cooperate with knife-edges 51 which extend circumferentially on the stator structure to form the circumferential seal adjacent to the working medium flowpath to bound the pressurized cooling cavities 44 through which the flowpath for cooling fluid passes.

A lock ring 104 in the installed and operative positions is disposed in the insulating gap I. The lock ring is adapted by a first side 106 and a second side 108 to engage the blade lock 66 and the disk 18 in the axial direction to prevent fore and aft movement of the blade lock. The lock ring has a height H which is less than the depth of the groove G such that the lock ring is movable to a second position (shown in phantom) in the groove G out of engagement with the blade lock. In the embodiment shown, the lock ring does not extend across the radial gap B between the rotor blade and rotor disk. As a result, the cooling flowpath extends beneath the rotor blade and provides cooling at the interface of the dead rim region and live rim region. In other embodiments, the height H of the lock ring may extend radially across the gap B and provide sealing to this area of the disk and additional shearing to resist the axial load on the rotor blades.

The lock ring 104 extends circumferentially about the rotor disk. The lock ring is circumferentially continuous except for being interrupted circumferentially at one location, as shown in FIG. 2, to form a split ring. The circumferential interruption has a length L which is sufficient to permit assembly of the ring by enabling the ring to deflect radially outwardly a sufficient amount to be installed over the projection into the insulating gap G'; and, to deflect inwardly to the second position in the groove G shown by the phantom lines in FIG. 3 which permits removal of the blade lock by sliding the blade lock axially once the lock ring is moved.

As shown in FIG. 3, each blade lock 66 has a small access hole 112 which extends from the exterior of the blade lock to the insulating gap G'. The access hole adapts the thermal shield section 94 to receive a pin for urging the lock ring radially inwardly out of engagement with the blade lock during assembly and disassembly of the structure.

In the particular embodiment shown, an optional lock pin 114 may be inserted. The optional lock pin extends from the disk 18 (at the bottom of the extension 58a of the blade retention groove 58) to the slot 86 in the second section 78 of the projection 68. The lock pin has an axial part 116 which is trapped radially between the blade, lock and the rotor disk and has a radial part 118 which is trapped axially between the blade lock 66 and the rotor blade 26. This enables the lock pin to radially trap the lock ring in place against movement in the radial inward direction.

The flowpath 42 for cooling fluid extends up the face of the side plate 72 and the disk 18 and into the cooling cavity 44. The second flowpath 75 for cooling fluid enables cooling fluid to flow beneath the blade lock 66 and the rotor blade 26 to provide cooling to that region of the rotor disk assembly and into the cooling cavity 45 to pressurize the cavity against hot working medium gases from the flowpath 34. In some embodiments of the invention, this cavity will have higher operative temperatures than the adjacent rotor disk 18 because of its proximity to the flowpath for working medium gases. In other embodiments of the invention, such as the present rocket engine embodiment, the cavity will have lower operative temperatures than the adjacent rotor disk despite its proximity to the flowpath. In either case, the thermal shield section 94 and insulating gap I interrupts the transfer of heat to or from the dead rim $D_d$ of the disk and avoids the severe axial gradients and the accompanying thermal stresses at the blade retention side of the disk. These gradients are now found in the projection 68.

Figure 4:
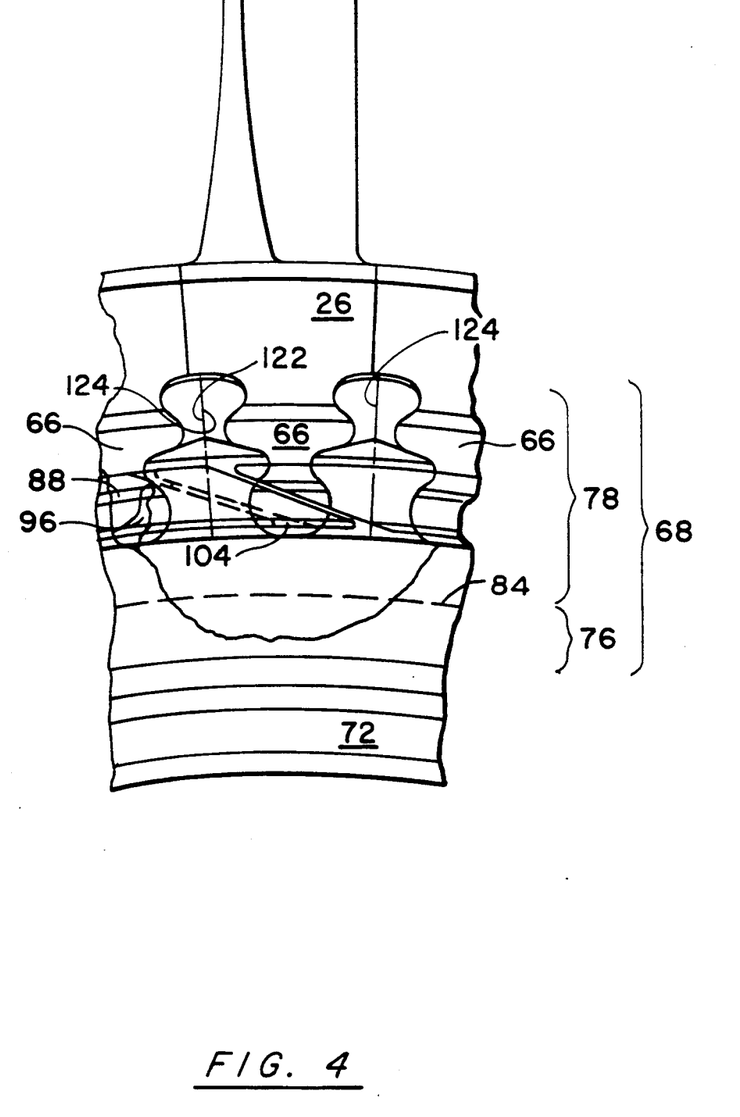
FIG. 4 is a side elevation view taken along the lines 3—3 of FIG. 1.

FIG. 4 is a side view taken along the lines 4—4 of FIG. 3 showing the relationship of the blade lock 66 to the rotor disk 18 and rotor blades 26. More particularly, FIG. 4 shows the relationship of the blade lock to the first section 76 and the second section 78 of the projection and the slots therein, the lock ring 104 and the rotor blade 26. The relatively low mass of the blade lock 66 is evident from the low radial profile and axial profile of the blade lock. The radial profile of the blade lock is reduced by having the blade lock 66 extend from the outer portion (second section 78) of the projection an only shield the portion of the dead rim region which requires shielding. The mass of the blade lock and projection is reduced by forming the outer wall 92, which bounds the insulating gap I, by inserting the blade lock 66 in its slot 86. Thus, the wall has two functions, (1) radial and lateral blade lock retention and (2) an insulating wall (once the blade lock is inserted).

Adjacent blade locks 66 are in abutting contact, with the first edge 122 of one blade lock abutting the second edge 124 of the second blade lock. As will be realized, a single blade lock in some constructions might replace with smaller tolerances two or more of the individual blade locks, with attachments to the projection for example at every other blade location or at every other blade retention slot.

Figure 5:
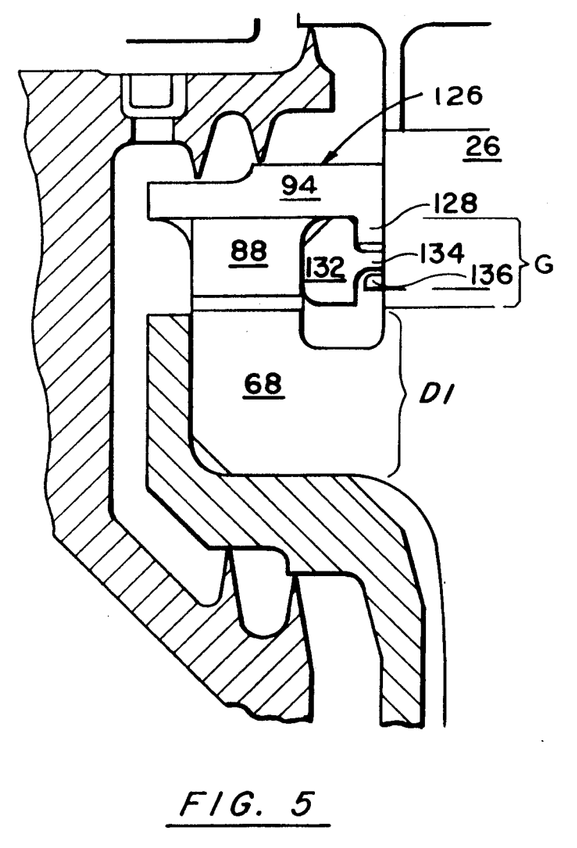
FIG. 5 is a side elevation, cross-sectional view of an alternate embodiment corresponding to the embodiment shown in FIG. 2.

FIG. 5 is an alternate embodiment of the blade lock 6 and lock ring 104 shown in FIG. 2 and FIG. 3 and corresponds to the view taken in FIG. 3. The blade lock 126 of FIG. 5 has a radial extension 128 from the thermal shield section 94. The radial extension 128 does not engage the blade retention slot. Instead, the thermal shield section extends in cantilevered fashion from the base section 88 of the blade lock. Accordingly, all radial loads of the blade lock shown in this alternate embodiment are transferred to the axial projection 68 and thence to the live rim region $D_l$ of the disk. A lock ring 132 is disposed in the insulating gap G'. An axial projection 134 on the lock ring and an axial projection 136 on the rotor blade 26 cooperate to trap the lock ring 132 in the radial direction. Should the rotor blade engage the lock ring under operative conditions, the radial load is transferred from the rotor blade to the lock ring and thence to the blade lock and thence into the live rim region of the disk.

Figure 6:
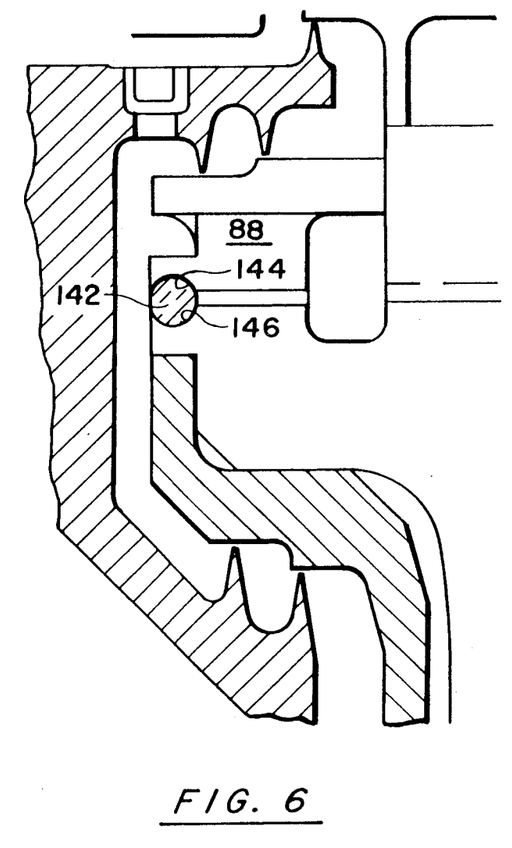
FIG. 6 is a side elevation, cross-sectional view of an alternate embodiment corresponding to the embodiment shown in FIG. 3.

FIG. 6 is an alternate embodiment of the blade lock 66 shown in FIG. 3 where the means for retaining the blade lock 138 against axial movement is a pin 142 and groove configuration, with a half-groove 144 on the blade lock and a cooperating half-groove 146 on the projection 68. An example of such a construction is shown in U.S. Pat. No. 4,389,161 entitled "Locking Of Rotor Blades On A Rotor Disk" issued to Claudio Brumman and assigned to the Assignee of this invention, the material of which is incorporated herein by reference. Such a construction would more likely be used in gas turbine engines for aircraft applications.

During operation of the rotary machine 10 shown in FIG. 1, hot, pressurized working medium gases from a gas generator (not shown) are flowed along the working medium flowpath 34. The gases approach temperatures of seventeen hundred degrees (1700°) Fahrenheit. The gases are expanded in the turbine 12 exerting a tangential force on the rotor blades 26 as the gases pass through the turbine. The rotor disk and blade assembly 18, 24, 26 is driven at high speeds about its axis of rotation $A_r$, causing the shaft 22 to rotate and drive the associated pump. The gases also exert an axial force on the rotor blades 26 tending to drive the rotor blades axially out of the blade retention (or attachment) slot 58. As the rotor blades are urged rearwardly in the blade retention slot, the rearmost rotor blade engages lock means such as the blade lock 66. The blade lock is urged against the lock ring 104 and the lock ring against the projection 68 from the live rim D₁ of the disk. This blocks axial rearward movement of the rotor blade.

The radial load from the dead rim region $D_d$ of the disk 18, from the rotor blades 24, 26 and the spacers 62 disposed therebetween are transmitted radially to the live rim region of the disk. The dead rim area of the disk carries these significant loads without the benefit of the hoop strength of the rotor disk. This load is aggravated by fillet radiuses which form the blade retention slot 58 for the rotor blade.

As the hot working medium gases are flowed along the flowpath 34, heat is transferred from the gases directly to the outermost portion of the dead rim $D_d$ and indirectly to the dead rim via the rotor blades 24, 26, establishing a relatively high level of temperature along the axial length of the disk 18. The working medium gases are relatively hot in comparison to the cooling fluid (gases) which is flowed along the face of the disk, into the gap B underneath the blade lock and rotor blades and into the cooling cavity 44. The difference in temperature between these locations creates a large thermal gradient in the disk.

Shielding the dead rim with the blade lock 66 provides an important advantage. Shielding this area avoids severe axial thermal gradients and thermal stresses associated with such gradients at the side of the dead rim in the blade retention region of the disk. The stresses are avoided in this region even though there is heat transfer into the disk b contact between the blades and the disk, by direct contact between the hot working medium gases and the disk and even though there is heat transfer from the disk to the cooling fluid (gases).

The large thermal gradient does exist but it is across the projection 68 which carries the relatively light weight blade lock 66. The insulating gap I and groove G isolate the projection and its temperature gradient from the blade retention side 52 of the disk 18 and its temperature gradient, separating the gradients from each other.

Thus, the level of axial thermal stresses in the side of the dead rim region used for blade retention is reduced and the region can accept the large rotational loads of the rotor blades and dead rim of the rotor disk. Axial thermal gradients in the projection are more severe than in the side of the rotor disk. But, the overall level of stresses is acceptable in the projection because the rotational loads imposed on the projection by the blade lock are smaller than the rotational loads imposed on the blade retention slot.

In effect, this distributes the steep axial thermal gradient across the projection and diminishes the rotational load on the dead rim of the blade retention portion of the disk by transferring the mass of the blade lock to the projection. The construction allows both locations to operate with rotational loads and thermal stresses that are acceptable, and, in this way balances the mechanical and thermal stresses of both regions of the disk to enhance the fatigue life of the disk.

All radial loads associated with the lock ring 132, 142 and the blade lock of FIG. 5 and FIG. 6 are not exerted on the blade retention slot. Instead, these loads are transferred into the disk through the projection to a portion of the live rim which is spaced away from the region of the live rim which receives the dead rim loads.

A like benefit occurs in the construction shown in FIG. 2 and FIG. 3, but it is somewhat reduced because a portion of the blade lock 66 loads are transmitted into the live rim region of the disk at the location where blade loads are transferred into the live rim. Nevertheless, there is a benefit to such a construction in reducing the total load transmitted through the blade retention slot to the disk.

An additional benefit is provided by directly attaching to the disk the seal lands 98, 102 which face the knife-edges shown in FIG. 2 and FIG. 3. The clearance does not vary with rotational speed, resulting in tighter clearances and more efficient operation of the engine. A similar benefit is obtained with the knife-edges shown in FIG. 5 and FIG. 6 by placing the seal lands directly over the axial projection from the disk. In each of these constructions both lands deflect the same amount.

Finally, the small mass of the blade lock 66 made possible with this construction reduces radial loads on the overall disk structure and compares very favorably with constructions which use much more mass to achieve blade retention or cooling of the disk.

Although the invention has been shown and described with respect to detailed embodiment thereof, it should be understood by those skilled in the art that various changes in form and detail thereof may be made without departing from the spirit and the scope of the claimed invention.

I claim:

1. A rotor disk and rotor blade assembly of the type having an axis of rotation which is adapted for use in an axial flow rotary machine having a working medium flowpath, the rotor disk including a first side and a second side facing in opposite axial directions and a rim region having a circumferentially continuous live rim region and a circumferentially discontinuous dead rim region, the dead rim region having a plurality of blade attachment slots extending in an axially oriented direction from the first side of the disk, the assembly including a plurality of rotor blades each having an airfoil extending outwardly from each of said attachment slots and having a root which engages the attachment slot, the improvement which comprises:

a rotor disk having a projection which extends axially from the live rim region of the first side of the rotor disk the projection having an inner part which extends axially form the first side of the disk and an outer part which extends radially outward form the inner part;

a blade lock which engages the outer part of the projection, and which extends from the projection to the dead rim to shield the dead rim, the blade lock being spaced for the first side of the dead rim of the disk over a portion of radial height of the blade lock to leave na insulating gap therebetween; and, lock means from blocking axial movement of the blade lock;

wherein shielding the dead rim of the disk reduces thermal gradients and stresses and wherein the axial projection supports at least part of the blade lock form the live rim of the disk and extends axially and radially about the blade lock to restrain the blade lock against radial and lateral movement.

2. The rotor disk and rotor blade assembly of claim 1, wherein the blade lock has a first section which engages the axial projection and a radial extension of the blade lock which engages the dead rim region of the first side of the disk, the radial extension being spaced axially from the projection and first section of the blade lock to leave an insulating gap therebetween.

3. The rotor disk and rotor blade assembly of claim 2, wherein the blade lock has a thermal shield section which extends from the first section of the blade lock to the radial extension of the blade lock.

4. The rotor disk and rotor blade assembly of claim 2, wherein the lock means is a lock ring disposed in the insulating gap and the lock ring extends laterally with respect to the disk, the lock ring engaging the blade lock and engaging the projection and the side of the disk to block axial movement of the blade lock.

5. The rotor disk and rotor blade assembly of claim 4, wherein the projection has a circumferentially extending groove inwardly of the insulating gap which extends laterally to permit movement of the lock ring to a second position, in the groove, out of engagement with the blade lock.

6. A rotor disk and rotor blade assembly of the type having an axis of rotation which is adapted for use in an axial flow rotary machine having a working medium flowpath, the rotor disk including a first side and a second side facing in opposite axial directions and a rim region having a circumferentially continuous live rim region and a circumferentially discontinuous dead rim region, the dead rim region having a plurality of blade attachment slots extending in an axially oriented direction from the first side of the disk, the assembly including a plurality of rotor blades each having an airfoil extending outwardly from each of said attachment slots and having a root which engages the attachment slot, the improvement which comprises:

a rotor disk having a projection which extends axially from the live rim region of the first side of the rotor disk having
  a first section which extends axially from the rotor disk at a location which is spaced radially inwardly from the dead rim region of the rotor disk,
  a second section which extends radially outward from the first section, the second section being spaced axially from the rim region of the rotor disk leaving a groove therebetween which extends laterally with respect to the blade attachment slot, the groove having a depth G, and
  a plurality of slots, one at each rotor blade, which extend axially through the second section of the projection, each slot having a depth G' which interrupts the circumferential continuity of the groove,
a blade lock at each slot in the projection which has
  a base section which engages the slot in the disk and extends radially, the base section of the blade lock and the second section of the projection forming a wall which is spaced axially from the dead rim region of the disk leaving an insulating gap I therebetween,
  a thermal shield section which extends axially from the base section into close proximity with the disk, the thermal shield section radially bounding the insulating gap I, the thermal shield section having
    a radial extension which extends radially inwardly to axially bound the insulating gap I, and block movement of the rotor blade under operative conditions, and,
    a seal land on the base section which faces radially outwardly and is directly radially supported by the projection which is directly beneath the seal land;
a lock ring which is interrupted circumferentially at one location to form a split ring, the lock ring having a first installed position at which the ring is disposed in the insulating gap I and extends circumferentially about the rotor disk, the ring being adapted to engage the blade lock and the disk in the axial direction to prevent fore and aft movement of the blade lock, the lock ring having a height H which is less than the depth of the groove G such that the lock ring is movable to a second position in the groove out of engagement with the blade lock;
wherein a portion of the radial load exerted by the blade lock and lock ring are transferred to the projection and thence to the live rim of the disk to reduce the load transmitted through the dead rim of the disk at the blade attachment slot, wherein the seal land is positively supported against radial deflection by the axial projection directly beneath the seal land, wherein the blade lock blocks heat transfer from the dead rim of the disk to the cooling gases to decrease axial thermal gradients in the dead rim and wherein the insulating gap and groove move the location of axial thermal stresses in the disk resulting from the hot working medium gases and the cooling gases away from the blade load transfer region to the live rim of the disk.

7. The rotor disk and rotor blade assembly of claim 6 wherein the second radial extension of the blade lock extends inwardly from the heat shield section to engage a slot in the disk to simply support the blade lock at both ends.

8. The rotor disk and rotor blade assembly of claim 7 wherein the slot in the disk is a continuation of the blade retention slot.

9. The rotor disk and rotor blade assembly of claim 6 wherein the second radial extension from the heat shield section of the blade lock is supported by the thermal shield section in cantilevered fashion from the base section of the blade lock to transfer all rotational loads on the blade lock to the projection which extends from the live rim of the disk.

10. The rotor disk and rotor blade assembly of claim 9 wherein the heat shield section has an access hole extending through the heat shield section which adapts the heat shield to receive a pin for urging the lock ring radially inwardly out of engagement with the blade lock during assembly and disassembly.

* * * * *

UNITED STATES PATENT AND TRADEMARK OFFICE
CERTIFICATE OF CORRECTION

PATENT NO. : 5,151,013

DATED : September 29, 1992

INVENTOR(S) : JERRY H. MOORE

It is certified that error appears in the above-identified patent and that said Letters Patent is hereby corrected as shown below:

Col. 1, line 29 "Turboprops" should be --Turbopumps--.

Col. 10, line 44 "form" should be --from--

Col. 10, line 50 "for" should be --from--

Col. 10, line 52 "na" should be --an--

Col. 10, line 58 "form" should be --from--

Signed and Sealed this

Twenty-eighth Day of September, 1993

Attest:

BRUCE LEHMAN

*Attesting Officer*    *Commissioner of Patents and Trademarks*